(No Model.)
J. A. JEFFREY.
DRIVE CHAIN.
No. 366,587.  Patented July 12, 1887.
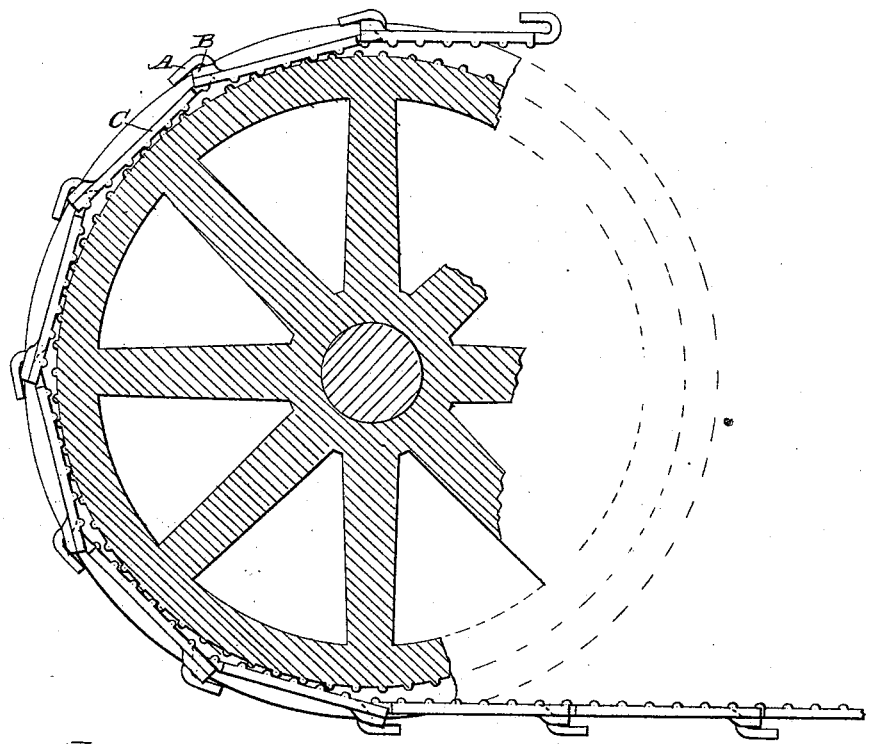
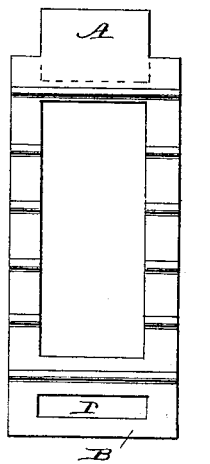
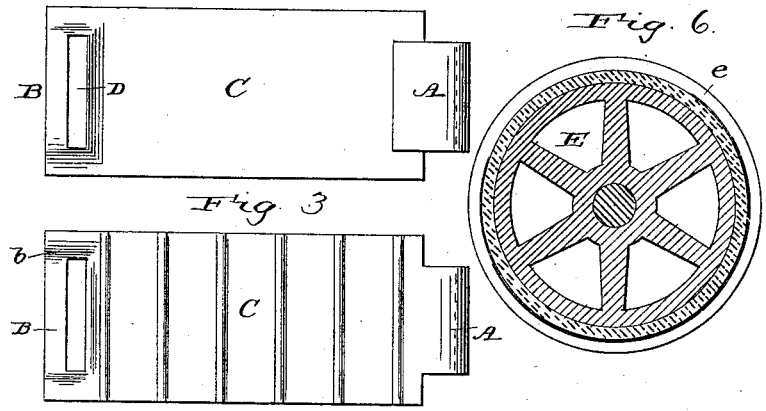
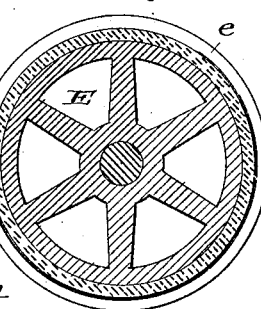
Witnesses
N. N. Low
L. H. Marshall
Inventor
Joseph A. Jeffrey
by Doubleday & Bliss
att'ys

UNITED STATES PATENT OFFICE.

JOSEPH A. JEFFREY, OF COLUMBUS, OHIO.

DRIVE-CHAIN.

SPECIFICATION forming part of Letters Patent No. 366,587, dated July 12, 1887.

Application filed March 6, 1883. Serial No. 87,240. (No model.)

*To all whom it may concern:*

Be it known that I, JOSEPH A. JEFFREY, a citizen of the United States, residing at Columbus, in the county of Franklin and State of Ohio, have invented certain new and useful Improvements in Drive-Chains, of which the following is a specification, reference being had therein to the accompanying drawings.

Figure 1 is a section of a wheel and chain containing my invention. Fig. 2 is a top view of the chain-link. Fig. 3 is a bottom view of the same. Fig. 4 is section of a part of a chain. Fig. 5 is a bottom plan view of my improved link with a central sprocket-opening, and Fig. 6 is a section of part of a wheel of modified form with which a chain is adapted to operate.

The links of which the chain is composed are detachable one from the other, and they may be constructed in any of the many ways now known for making detachable links. To permit detachability, however, I prefer the style of coupling devices which I have shown in the drawings, but which I do not claim as my invention.

A represents a hook; B, an end bar or cross-bar adapted to engage with the hook A of an adjacent link. The body of the link is formed of a continuous plate or bar, C, through which there is made the aperture D, to leave the cross-piece B for engaging with the hook. The body part of the link may be of any required thickness, it varying in that respect according to the purpose for which the chain is made and to which it is to be applied.

Upon the under side of the body part of the link there are formed ribs or corrugations, providing the means by which engagement with the wheel is effected.

When preferred, the under side of the link may be recessed or made concave, as indicated at *b*, Figs. 2 and 3, to provide for the reception of the hook, while at the same time permitting the lower face of adjacent links of the chain to be in a plane. Such recess may be either cast in the link, or may be formed therein by swaging or striking up; but I do not wish to be limited to such construction.

In Fig. 1 I have shown this chain in combination with a wheel having a ribbed or corrugated surface which is especially adapted to be traversed by the chain and to run at high rates of speed.

In Fig. 6 I have shown a modified chain-wheel having an iron hub, with flanges *e e* projecting radially from the sides of its working-face. Between the flanges there is a channel to receive a lining or engaging surface of lead or other relatively-soft metal, or of rubber, leather, or other suitable yielding or elastic material, which is adapted to secure a firm frictional contact between the wheel and the chain. A wheel of this character is also adapted to run with less noise than would be ordinarily produced by driving the chain at high rates of speed over a cast-iron wheel.

I do not in this case claim anything relating to the structure of the wheel, nor of the combination of the chain with the wheel, reserving the right to claim such subject-matter in a concurrent application to be filed as a division hereof.

What I claim is—

The herein-described drive chain link, it having a coupling-hook, A, at one end, a coupling-bar, B, at the opposite end, the central sprocket-aperture, and the side bars provided upon one face with small ribs or corrugations adapted to engage frictionally with a wheel, substantially as set forth.

In testimony whereof I affix my signature in presence of two witnesses.

JOSEPH A. JEFFREY.

Witnesses:
J. M. TIBBETTS,
JAS. H. GODMAN.